US011889362B2

(12) United States Patent
Rico Alvarino et al.

(10) Patent No.: US 11,889,362 B2
(45) Date of Patent: *Jan. 30, 2024

(54) CARRIER AGGREGATION FOR LOW-LATENCY HANDOVER

(71) Applicant: QUALCOMM Incorporated, San Diego, CA (US)

(72) Inventors: Alberto Rico Alvarino, San Diego, CA (US); Aziz Gholmieh, Del Mar, CA (US); Umesh Phuyal, San Diego, CA (US); Prasad Reddy Kadiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1315 days.

This patent is subject to a terminal disclaimer.

(21) Appl. No.: 16/374,682

(22) Filed: Apr. 3, 2019

(65) Prior Publication Data

US 2019/0313298 A1   Oct. 10, 2019

Related U.S. Application Data

(60) Provisional application No. 62/655,753, filed on Apr. 10, 2018.

(51) Int. Cl.
*H04W 36/00* (2009.01)

(52) U.S. Cl.
CPC ......... *H04W 36/0072* (2013.01); *H04W 36/0044* (2013.01); *H04W 36/0069* (2018.08); *H04W 36/00837* (2018.08)

(58) Field of Classification Search
CPC ......... H04W 36/0044; H04W 36/0058; H04W 36/0016; H04W 36/30; H04W 36/00837; H04W 36/0069; H04W 36/0072
See application file for complete search history.

(56) References Cited

U.S. PATENT DOCUMENTS

| 11,438,813 B2* | 9/2022 | Kadiri ............... H04W 36/0072 |
| 2011/0275374 A1 | 11/2011 | Narasimha et al. |
| 2013/0329583 A1* | 12/2013 | Vrzic .................... H04W 36/30 |
| | | 370/252 |

(Continued)

FOREIGN PATENT DOCUMENTS

| CN | 101808373 A | 8/2010 |
| CN | 102870463 A | 1/2013 |

(Continued)

OTHER PUBLICATIONS

Huawei et al., "UE Capabilities for Mobility Enhancements", 3GPP Draft; R2-166397 UE Capabities for Mobility Enhancements, 3rd Generation Partnership Project (3GPP), Mobile Competence Centre; 650, Route Des Lucioles ; F-06921 Sophia-Antipolis Cedex ; France, vol. RAN WG2, No. Kaohsiung; Oct. 10, 2016-Oct. 14, 2016, Oct. 9, 2016 (Oct. 9, 2016), XP051150954, 2 Pages, Retrieved from the Internet: URL:http://www.3gpp.org/ftp/Meetings_3GPP_SYNC/RAN2/Docs/ [retrieved on Oct. 9, 2016], Whole section 2.

(Continued)

*Primary Examiner* — Oussama Roudani
(74) *Attorney, Agent, or Firm* — Harrity & Harrity, LLP

(57) ABSTRACT

Various aspects of the present disclosure generally relate to wireless communication. In some aspects, a user equipment (UE) may provide information identifying a band combination capability for carrier aggregation during a handover of the UE, wherein the band combination capability identifies a plurality of bands or carriers; and perform the handover based at least in part on the information identifying the band combination capability, wherein at least one first band or carrier, of the plurality of bands or carriers, is used for a source base station of the handover and at least one second band or carrier, of the plurality of bands or carriers, is used for a target base station of the handover. Numerous other aspects are provided.

30 Claims, 6 Drawing Sheets

(56) References Cited

U.S. PATENT DOCUMENTS

| | | | | |
|---|---|---|---|---|
| 2014/0135014 A1* | 5/2014 | Li | ............... | H04W 36/0072 |
| | | | | 455/436 |
| 2014/0341166 A1* | 11/2014 | Narasimha | .......... | H04W 56/001 |
| | | | | 370/329 |
| 2016/0029330 A1* | 1/2016 | Siomina | ............ | H04W 56/0055 |
| | | | | 370/328 |
| 2016/0270139 A1* | 9/2016 | Rahman | ............... | H04W 72/20 |
| 2018/0184342 A1* | 6/2018 | Peisa | ................ | H04W 36/0072 |
| 2020/0162972 A1* | 5/2020 | Vesterinen | ........ | H04W 36/0069 |

FOREIGN PATENT DOCUMENTS

| | | |
|---|---|---|
| EP | 2566246 A2 | 3/2013 |
| KR | 20170114258 A | 10/2017 |
| WO | 2017163670 A1 | 9/2017 |
| WO | 2017163676 A1 | 9/2017 |

OTHER PUBLICATIONS

Huawei Hisilicon: "0ms Mobility Interruption in NR", 3GPP Draft; R2-168564 0MS Mobility Interruption In NR, 3rd Generation Partnership Project (3GPP), Mobile Competence Centre ; 650, Route Des Lucioles ; F-06921 Sophia- Antipolis Cedex ; France, vol. RAN WG2, No. Reno, Nevada; Nov. 14, 2016-Nov. 18, 2016, Nov. 13, 2016 (Nov. 13, 2016), XP051178139, 6 Pages, Retrieved from the Internet: URL:http://www.3gpp.org/ftp/Meetings_3GPP_SYNC/RAN2/Docs/ [retrieved on Nov. 13, 2016], Section 2.2.

Interdigital Communications: "Inter-Cell and Inter-Node UE RRC Driven Mobility in NR", 3GPP Draft; R2-1701194 (NR SI AI103111 RRC Driven Mobility), 3rd Generation Partnership Project (3GPP), Mobile Competence Centre; 650, Route Des Lucioles ; F-06921 Sophia-Antipolis Cedex ; France, vol. RAN WG2, No. Athens, Greece; Feb. 13, 2017-Feb. 17, 2017, Feb. 12, 2017 (Feb. 12, 2017), XP051211883, 3 Pages, Retrieved from the Internet: URL: http://www.3gpp.org/ftp/Meetings_3GPP_SYNC/RAN2/Docs/ [retrieved on Feb. 12, 2017], Sections 2.1-2.3.

International Search Report and Written Opinion—PCT/US2019/025868—ISA/EPO—dated May 23, 2019.

Samsung: "Inter-Frequency Handover for the Make-Before-Break Mobility Enhancement", 3GPP Draft; R2-168879_EMOB_MBB_IFREQ_V08, 3rd Generation Partnership Project (3GPP), Mobile Competence Centre ; 650, Route Des Lucioles ; F-06921 Sophia-Antipolis Cedex ; France, vol. RAN WG2, No. Reno, US; Nov. 14, 2016-Nov. 18, 2016, Nov. 14, 2016 (Nov. 14, 2016 ), XP051178426, 7 Pages, Retrieved from the Internet: URL:http://www.3gpp.org/ftp/Meetings_3GPP_SYNC/RAN2/Docs/ [retrieved on Nov. 14, 2016], Sections 2-3.

ZTE Corporation: "Email Discussion Report on Open Issues of Mobility Enhancement", 3GPP Draft; R2-168942 Email Discussion Report on Open Issues of Mobility Enhancement, 3rd Generation Partnership Project (3GPP), Mobile Competence Centre ; 650, Route Des Lucioles ; F-06921 Sophia-Antipolis vol. RAN WG2, No. Reno, Nevada, USA; Nov. 14, 2016-Nov. 18, 2016, Nov. 18, 2016 (Nov. 18, 2016), XP051193476, 12 Pages, Retrieved from the Internet: URL:http://www.3gpp.org/ftp/tsg_ran/WG2_RL2/TSGR2_96/Docs/ [retrieved on Nov. 18, 2016], Section 2.7.

* cited by examiner

CARRIER AGGREGATION FOR LOW-LATENCY HANDOVER

CROSS-REFERENCE TO RELATED APPLICATIONS UNDER 35 U.S.C. § 119

This application claims priority to Provisional Patent Application No. 62/655,753, filed on Apr. 10, 2018, entitled "TECHNIQUES AND APPARATUSES FOR CARRIER AGGREGATION FOR LOW-LATENCY HANDOVER," which is hereby expressly incorporated by reference herein.

FIELD OF THE DISCLOSURE

Aspects of the present disclosure generally relate to wireless communication, and more particularly to techniques and apparatuses for carrier aggregation for low-latency handover.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include providing information identifying a band combination capability for carrier aggregation during a handover of the UE, wherein the band combination capability identifies a plurality of bands or carriers; and performing the handover based at least in part on the information identifying the band combination capability, wherein at least one first band or carrier, of the plurality of bands or carriers, is used for a source base station of the handover and at least one second band or carrier, of the plurality of bands or carriers, is used for a target base station of the handover.

In some aspects, a UE for wireless communication may include memory and one or more processors operatively coupled to the memory. The memory and the one or more processors may be configured to provide information identifying a band combination capability for carrier aggregation during a handover of the UE, wherein the band combination capability identifies a plurality of bands or carriers; and perform the handover based at least in part on the information identifying the band combination capability, wherein at least one first band or carrier, of the plurality of bands or carriers, is used for a source base station of the handover and at least one second band or carrier, of the plurality of bands or carriers, is used for a target base station of the handover.

In some aspects, a non-transitory computer-readable medium may store one or more instructions for wireless communication. The one or more instructions, when executed by one or more processors of a UE, may cause the one or more processors to provide information identifying a band combination capability for carrier aggregation during a handover of the UE, wherein the band combination capability identifies a plurality of bands or carriers; and perform the handover based at least in part on the information identifying the band combination capability, wherein at least one first band or carrier, of the plurality of bands or carriers, is used for a source base station of the handover and at least one second band or carrier, of the plurality of bands or carriers, is used for a target base station of the handover.

In some aspects, an apparatus for wireless communication may include means for providing information identifying a band combination capability for carrier aggregation during a handover of the apparatus, wherein the band combination capability identifies a plurality of bands or carriers; and means for performing the handover based at least in part on the information identifying the band combination capability, wherein at least one first band or carrier, of the plurality of bands or carriers, is used for a source base station of the handover and at least one second band or carrier, of the plurality of bands or carriers, is used for a target base station of the handover.

In some aspects, a method of wireless communication, performed by a base station, may include receiving information identifying a band combination capability for carrier aggregation during a handover of a UE, wherein the band combination capability identifies a plurality of bands or carriers; and transmitting handover information for the handover of the UE based at least in part on the information identifying the band combination capability, wherein at least one first band or carrier, of the plurality of bands or carriers, is used for a source base station of the handover and at least one second band or carrier, of the plurality of bands or carriers, is used for a target base station of the handover, and wherein the handover information identifies the at least one first band or carrier and the at least one second band or carrier.

In some aspects, a base station for wireless communication may include memory and one or more processors operatively coupled to the memory. The memory and the one or more processors may be configured to receive information identifying a band combination capability for carrier aggregation during a handover of a UE, wherein the band combination capability identifies a plurality of bands or carriers; and transmit handover information for the handover of the UE based at least in part on the information identifying the band combination capability, wherein at least one first band or carrier, of the plurality of bands or carriers, is used for a source base station of the handover and at least one second band or carrier, of the plurality of bands or carriers, is used for a target base station of the handover, and wherein the handover information identifies the at least one first band or carrier and the at least one second band or carrier.

In some aspects, a non-transitory computer-readable medium may store one or more instructions for wireless communication. The one or more instructions, when executed by one or more processors of a base station, may cause the one or more processors to receive information identifying a band combination capability for carrier aggregation during a handover of a UE, wherein the band combination capability identifies a plurality of bands or carriers; and transmit handover information for the handover of the UE based at least in part on the information identifying the band combination capability, wherein at least one first band or carrier, of the plurality of bands or carriers, is used for a source base station of the handover and at least one second band or carrier, of the plurality of bands or carriers, is used for a target base station of the handover, and wherein the handover information identifies the at least one first band or carrier and the at least one second band or carrier.

In some aspects, an apparatus for wireless communication may include means for receiving information identifying a band combination capability for carrier aggregation during a handover of a UE, wherein the band combination capability identifies a plurality of bands or carriers; and means for transmitting handover information for the handover of the UE based at least in part on the information identifying the band combination capability, wherein at least one first band or carrier, of the plurality of bands or carriers, is used for a source base station of the handover and at least one second band or carrier, of the plurality of bands or carriers, is used for a target base station of the handover, and wherein the handover information identifies the at least one first band or carrier and the at least one second band or carrier.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
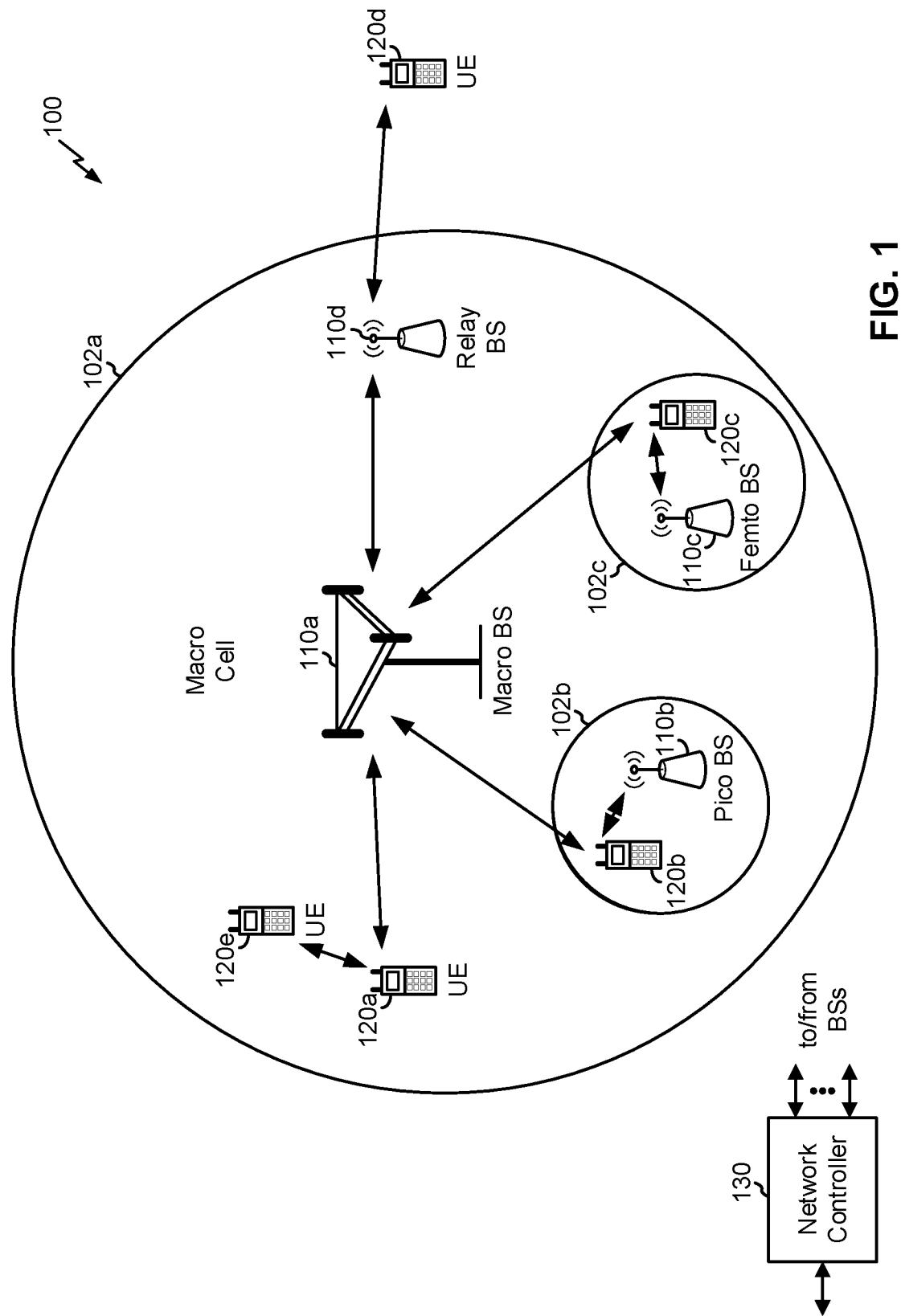
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, a smart meter or sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples may differ from what is described with regard to FIG. 1.

Figure 2:
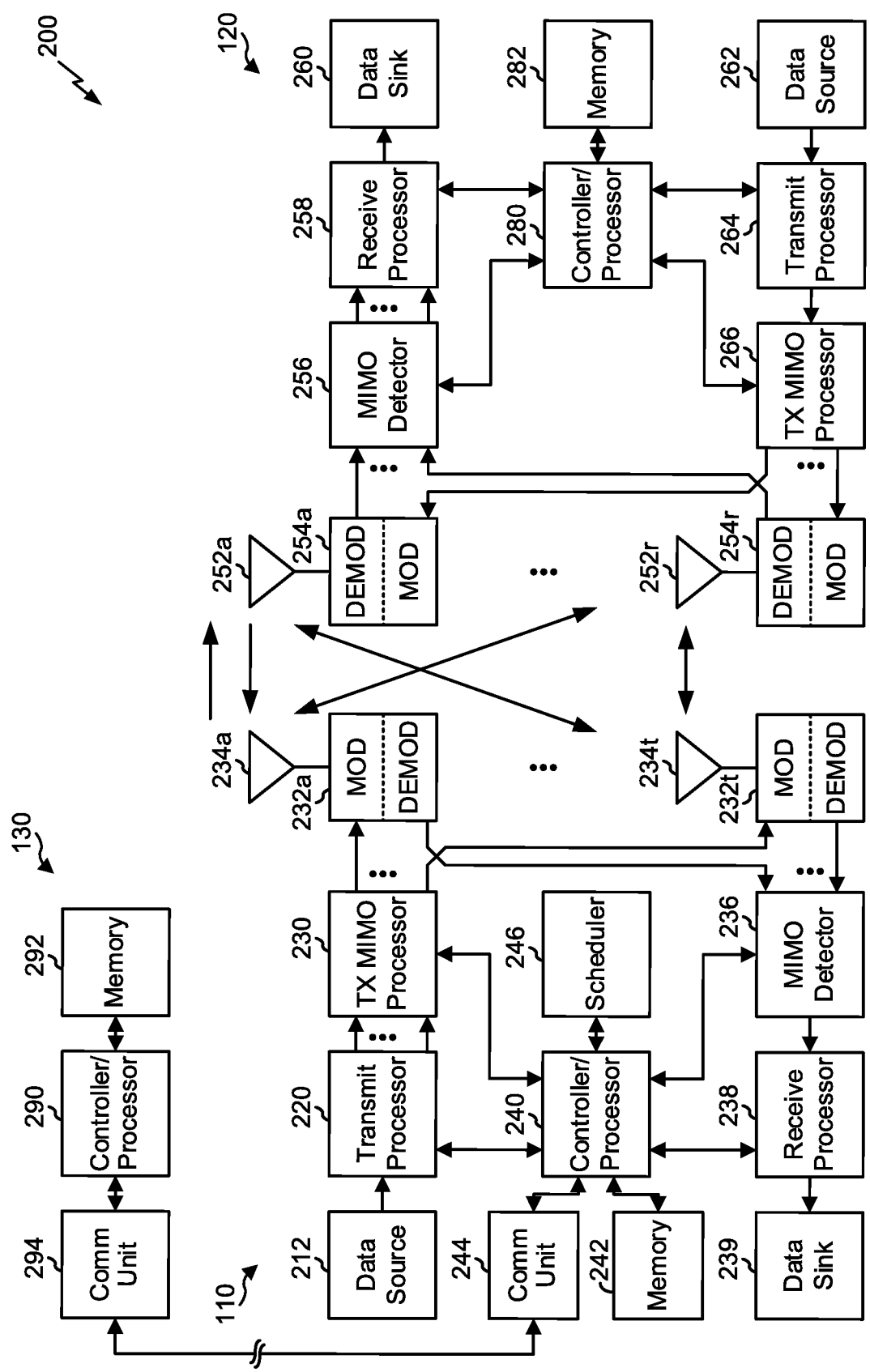
FIG. 2 is a block diagram conceptually illustrating an example of a base station in communication with a UE in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with carrier aggregation for low-latency handover, as described in more detail elsewhere herein. For example, controller/processor 240 of BS 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for BS 110 and UE 120, respectively. A scheduler 246 may schedule UEs for data transmission on the downlink and/or uplink.

In some aspects, UE 120 may include means for providing information identifying a band combination capability for carrier aggregation during a handover of the UE, wherein the band combination capability identifies a plurality of bands or carriers; means for performing the handover based at least in part on the information identifying the band combination capability, wherein at least one first band or carrier, of the plurality of bands or carriers, is used for a source base station of the handover and at least one second band or carrier, of the plurality of bands or carriers, is used for a target base station of the handover; means for receiving handover information indicating that the at least one first band or carrier is to be used for the source base station and the at least one second band or carrier is to be used for the target base station; and/or the like. In some aspects, such means may include one or more components of UE 120 described in connection with FIG. 2.

In some aspects, BS 110 may include means for receiving information identifying a band combination capability for carrier aggregation during a handover of a UE, wherein the band combination capability identifies a plurality of bands or carriers; means for transmitting handover information for the handover of the UE based at least in part on the information identifying the band combination capability, wherein at least one first band or carrier, of the plurality of bands or carriers, is used for a source base station of the handover and at least one second band or carrier, of the plurality of bands or carriers, is used for a target base station of the handover, and wherein the handover information identifies the at least one first band or carrier and the at least one second band or carrier; means for providing second handover information based at least in part on which the UE is to communicate with the target base station after the handover is complete; and/or the like. In some aspects, such means may include one or more components of BS 110 described in connection with FIG. 2.

As indicated above, FIG. 2 is provided merely as an example. Other examples may differ from what is described with regard to FIG. 2.

Carrier aggregation (CA) may provide for communication in one or more bands using at least two component carriers (CCs), which may include a primary component carrier (PCC) or primary cell (PCell) and one or more primary secondary cells (PSCells), secondary cells (SCells), or secondary component carriers (SCCs). A PCell may be associated with an uplink and a downlink, whereas an SCell may be associated with only a downlink or, in some cases, an uplink and a downlink. A UE and a BS may handle configuration via the PCell and may use the SCell for data communication.

It may be desirable to decrease latency of a handover. For example, some approaches for a handover may cause significant interruption to ongoing calls or data transfers, thus impacting throughput and user experience. One technique to achieve low-latency handover is make-before-break, wherein a connection with a target BS is established before a connection with a source BS is ended. However, in many cases, CA is not supported during handover. For example, active SCells of a UE may be dropped while the UE is handed over, thereby reducing throughput.

Some techniques and apparatuses described herein provide for configuration and performance of a handover (e.g., a low-latency handover) using carrier aggregation with regard to a source BS and a target BS of the handover. For example, a UE may be capable (e.g., from a radio frequency perspective) of maintaining CA connectivity (e.g., a PCell and at least one SCell) with regard to the source BS and the target BS. Some techniques and apparatuses described herein may provide for signaling of such a capability and configuration of the UE to perform the handover while maintaining CA connectivity. Thus, techniques and apparatuses described herein may reduce latency of handover and increase throughput while a handover is performed.

Figure 3:
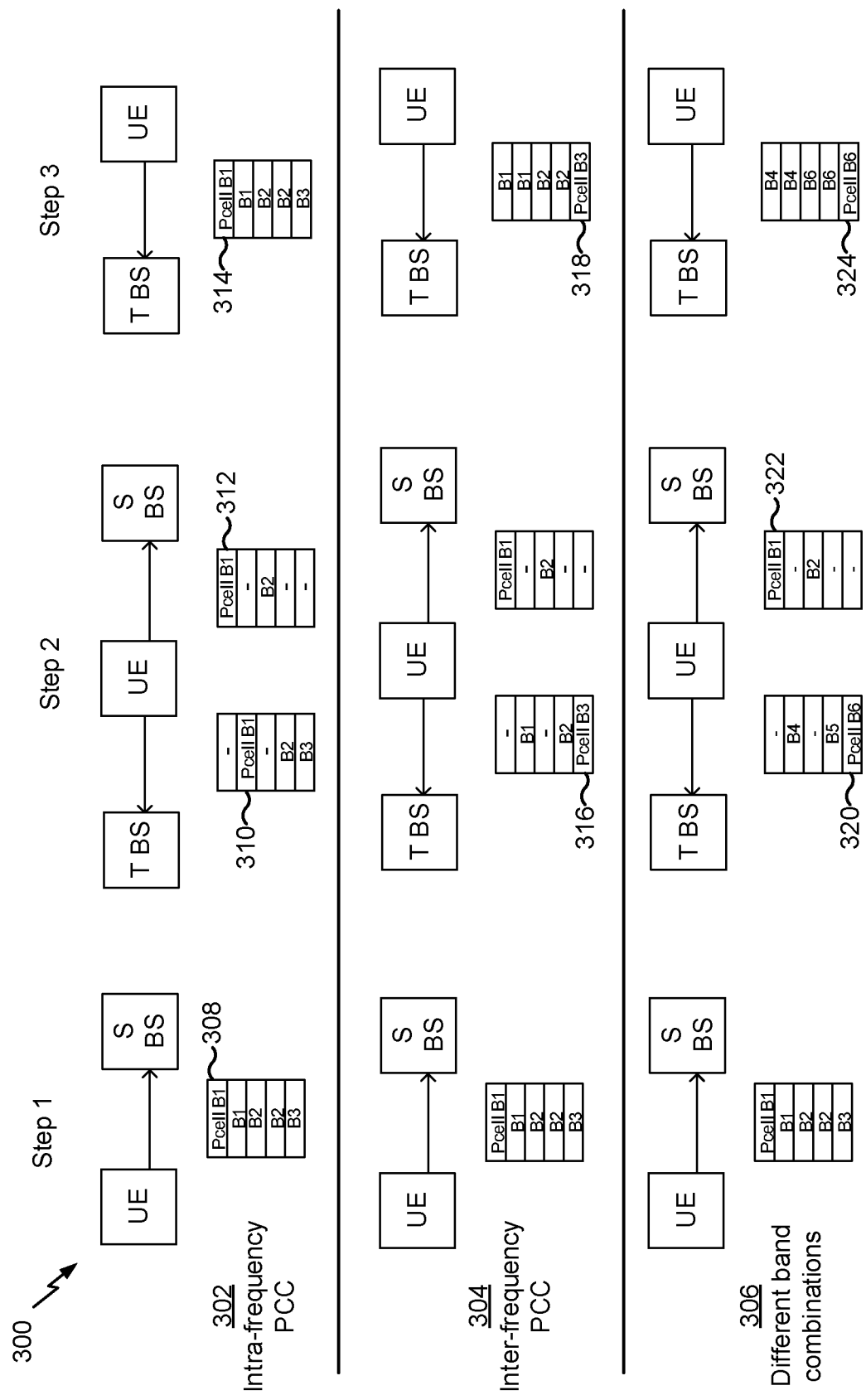
FIG. 3 is a diagram illustrating an example of performing low-latency handover using carrier aggregation, in accordance with various aspects of the present disclosure.

FIG. 3 is a diagram illustrating an example 300 of performing low-latency handover using carrier aggregation, in accordance with various aspects of the present disclosure. In FIG. 3, various cases of low-latency handover using carrier aggregation are shown. In each case, a Step 1, a Step 2, and a Step 3 are described. In Step 1 of each case, the UE (e.g., UE 120) is connected to a source BS (e.g., BS 110) (e.g., shown as S BS) using carrier aggregation. In Step 2 of each case, the UE is connected to the source BS and a target BS (e.g., BS 110) (e.g., shown as T BS) using carrier aggregation with regard to both of the BSs. In Step 3 of each case, the UE is connected to the target BS and not the source BS using carrier aggregation. For example, Step 1 may be thought of as a handover configuration step, Step 2 may be thought of as a handover performance step, and Step 3 may be thought of as a handover complete step. In FIG. 3, carriers of different bands are shown. For example, a carrier may be indicated by a rectangle (such as the rectangle shown by reference number 308, described in more detail below) and a band in which the carrier is included is indicated by B1, B2, B3, B4, B5, or B6. The combinations of carriers and bands shown in FIG. 3 may be referred to as band combinations, and a UE may have a band combination capability with regard to a particular BS.

As shown in FIG. 3, three handover cases are described: a first case, shown by reference number 302, in which PCells or PCCs of the source BS and the target BS are in the same band (e.g., the same frequency) and wherein the source BS and the target BS are associated with the same set of bands; a second case, shown by reference number 304, in which the PCells or PCCs of the source BS and the target BS are in different bands and wherein the source BS and the target BS are associated with the same set of bands; and a third case, shown by reference number 306, in which the source BS and the target BS are associated with different sets of bands. A BS may be said to be associated with a set of bands when the UE is capable of communicating with the BS using carrier aggregation on the set of bands.

Turning now to the first case, in Step 1 of the first case, the UE may communicate with the source BS using carriers on bands B1, B2, and B3, and may have a PCell for the source BS on a first carrier of band B1, as shown by reference number 308. In Step 2 of the first case, the UE may communicate with the target BS using carriers on bands B1, B2, and B3, and may communicate with the source BS using carriers on bands B1 and B2. As shown by reference number 310, the UE may have a PCell for the target BS on a second carrier of band B1, and, as shown by reference number 312, the UE may have a PCell for the source BS on the first carrier of band B1. In Step 3 of the first case, the UE may communicate with the target BS using carriers on bands B1, B2, and B3. As shown by reference number 314, the UE may have a PCell for the target BS on the first carrier of band B1. In each of the above cases, SCells of the UE may be those carriers that are not PCells. For example, in Step 1 of the first case, the second carrier of band B1, both carriers of band B2, and the carrier of band B3 may be SCells.

In some aspects, the UE may concurrently communicate with the source BS and the target BS using the same carrier. For example, the first carrier of band B1 may be used for the source BS and for the target BS.

In some aspects, the UE may determine a capability for the carriers of the source BS and the target BS based at least in part on whether a carrier is a duplex carrier or a downlink-only carrier. For example, a downlink-only carrier may not be usable for a PCell. In such a case, the UE may determine the capability so that only duplex carriers are used for PCells. For example, the UE may determine, if a band includes no duplex carriers for a particular BS, that the band cannot be used for a PCell with regard to the particular BS.

In some aspects, the UE may not support uplink carrier aggregation during handover. In such a case, the UE may switch the uplink between different PCells. For example, the UE may perform time division multiplexing of the uplink so that the uplink is provided for the source BS (shown by reference number 312) and the target BS (shown by reference number 314). In this way, a UE, that is not capable of uplink CA during a handover, can perform low-latency handover based at least in part on a make-before-break technique, thereby reducing latency of handover and improving throughput.

Turning now to the second case, Step 1 of the second case is similar to Step 1 of the first case. In Step 2 of the second case, as shown by reference number 316, the UE may have a PCell for the target BS on a carrier of band B3, and may have a PCell for the source BS on the first carrier of band B1. In Step 3 of the second case, as shown by reference number 318, the UE may use the PCell on the carrier of band B3 after handover is complete. Thus, the UE may maintain CA for low-latency handover wherein different bands are used for PCCs of the source BS and the target BS.

Turning now to the third case, Step 1 of the third case is similar to Step 1 of the first case and the second case. In Step 2 of the third case, as shown by reference number 320, the UE may have a PCell for the target BS on a carrier of band B6, and the target BS may be associated with bands B4 and B5, which are different than bands B1, B2, and B3 of the source BS. Furthermore, as shown by reference number 322, the UE may have a PCell for the source BS on the first carrier of band B1. In Step 3 of the third case, as shown by reference number 324, the UE may use the PCell on the carrier of band B6 after handover is complete. Thus, the UE may maintain CA for low-latency handover wherein different bands are used for all CCs of the source BS and the target BS.

Figure 4:
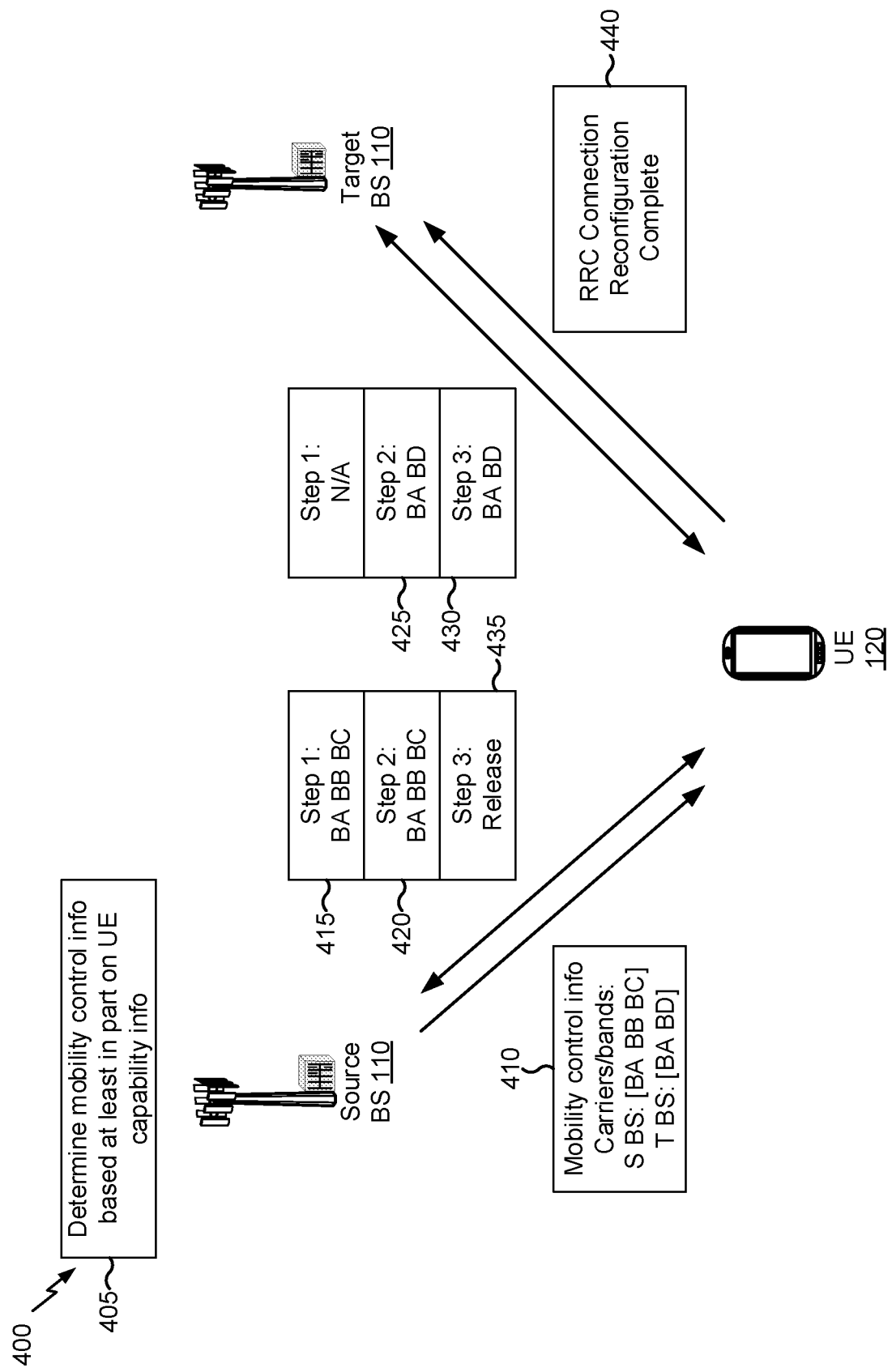
FIG. 4 is a diagram illustrating another example of performing low-latency handover using carrier aggregation, in accordance with various aspects of the present disclosure.

For a more detailed description of the signaling that may be used to configure and execute the handover based at least in part on the above combinations of carriers and/or bands, refer to FIG. 4.

As indicated above, FIG. 3 is provided as an example. Other examples may differ from what is described with respect to FIG. 3.

FIG. 4 is a diagram illustrating another example 400 of performing low-latency handover using carrier aggregation, in accordance with various aspects of the present disclosure.

As shown in FIG. 4, and by reference number 405, a source BS 110 (or, in some aspects, a target BS 110) may determine mobility control information based at least in part on UE capability information. For example, the UE 120 may provide the UE capability information to the source BS 110. The UE capability information may provide information identifying one or more capabilities with regard to CA combinations that are supported during a handover.

In some aspects, the UE capability information may be explicitly signaled. For example, the UE 120 may provide information identifying a first set of carriers and/or bands that is supported with regard to the source BS 110 and a second set of carriers and/or bands that is supported with regard to the target BS 110. In some aspects, the UE capability information may identify a set of carriers and/or bands that is supported with regard to both the source BS 110 and the target BS 110. For example, the UE capability information may identify a set of carriers and/or bands that are concurrently supported by the UE 120 irrespective of which carriers and/or bands are used for the source BS 110 and the target BS 110. In some aspects, the UE capability may be based at least in part on an overall band capability of the UE 120. For example, for each band combination, the UE 120 may indicate whether the UE 120 supports that band combination when performing a handover.

In some aspects, the UE capability information may be based at least in part on a legacy band configuration of the UE 120. For example, the UE capability information may identify a baseband capability (e.g., a maximum number of component carriers, a maximum bandwidth, etc.) to be used when determining the mobility control information. The source BS 110 may use the baseband capability and the legacy band configuration to determine the mobility control information, as described in more detail below.

The source BS 110 may determine the mobility control information based at least in part on the UE capability information. For example, the mobility control information may indicate one or more sets of carriers or bands to be used for the source BS 110 and the target BS 110. In some aspects, the mobility control information may indicate a first set of carriers or bands to be used for the source BS 110 before handover, a second set of carriers or bands to be used for the source BS 110 during handover, a third set of carriers or bands to be used for the target BS 110 during handover, and/or a fourth set of carriers or bands to be used for the target BS 110 after handover. In some aspects, the mobility control information may not identify the first set of carriers or bands to be used for the source BS 110 before handover. For example, the first set of carriers or bands may be configured using a previous configuration message. This reduces a size of the mobility control information, thereby conserving air interface resources.

As shown by reference number 410, the source BS 110 may provide the mobility control information to the UE 120. In some aspects, the source BS 110 may provide the mobility control information using radio resource control (RRC) signaling, downlink control information (DCI), a media access control (MAC) control element (CE), or a different type of signaling. As shown, the mobility control information may identify a first set of carriers or bands for the source BS 110 (e.g., shown as S BS) of BA, BB, and BC. As further shown, the mobility control information may identify a second set of carriers or bands for the target BS 110 (e.g., shown as T BS) of BA and BD.

As shown by reference number 415, in a first step of the handover (e.g., Step 1), the UE 120 may communicate with the source BS 110 using bands BA, BB, and BC. As shown by reference number 420, in a second step of the handover (e.g., Step 2), the UE 120 may communicate with the source BS 110 using bands BA, BB, and BC. As shown by reference number 425, in the second step of the handover, the UE 120 may communicate with the target BS 110 using bands BA and BD. For example, the UE 120 may apply the configuration identified by the mobility control information for the second step after the mobility control information is received. In some aspects, the UE 120 may use the configuration for the source BS 110 until the mobility control information is received, and may thereafter switch to the configuration for the second step. In some aspects, the UE 120 may automatically activate the carriers and/or bands of the target BS 110 during the handover procedure. For example, the UE 120 may start monitoring SCells of the target BS 110 after transmitting a particular message (e.g., a reconfiguration complete message) to the target BS 110 or the source BS 110. This may reduce activation delay with regard to the target BS 110.

As shown by reference number 430, in a third step of the handover (e.g., Step 3), the UE 120 may communicate with the target BS 110 using bands BA and BD. As shown by reference number 435, in the third step of the handover, the UE 120 may release the connection with the source BS 110. For example, the UE 120 may release the connection based at least in part on the RRC connection reconfiguration complete message shown by reference number 440. In some aspects, the UE 120 may receive the RRC connection reconfiguration complete message from the target BS 110. In some aspects, the UE 120 may receive information identifying the configuration for the third step of the handover separately from the mobility control information. For example, the UE 120 may receive the information identifying the configuration for the third step of the handover in a transmission mode, a channel state information (CSI) configuration, and/or the like.

As indicated above, FIG. 4 is provided as an example. Other examples may differ from what is described with respect to FIG. 4.

Figure 5:
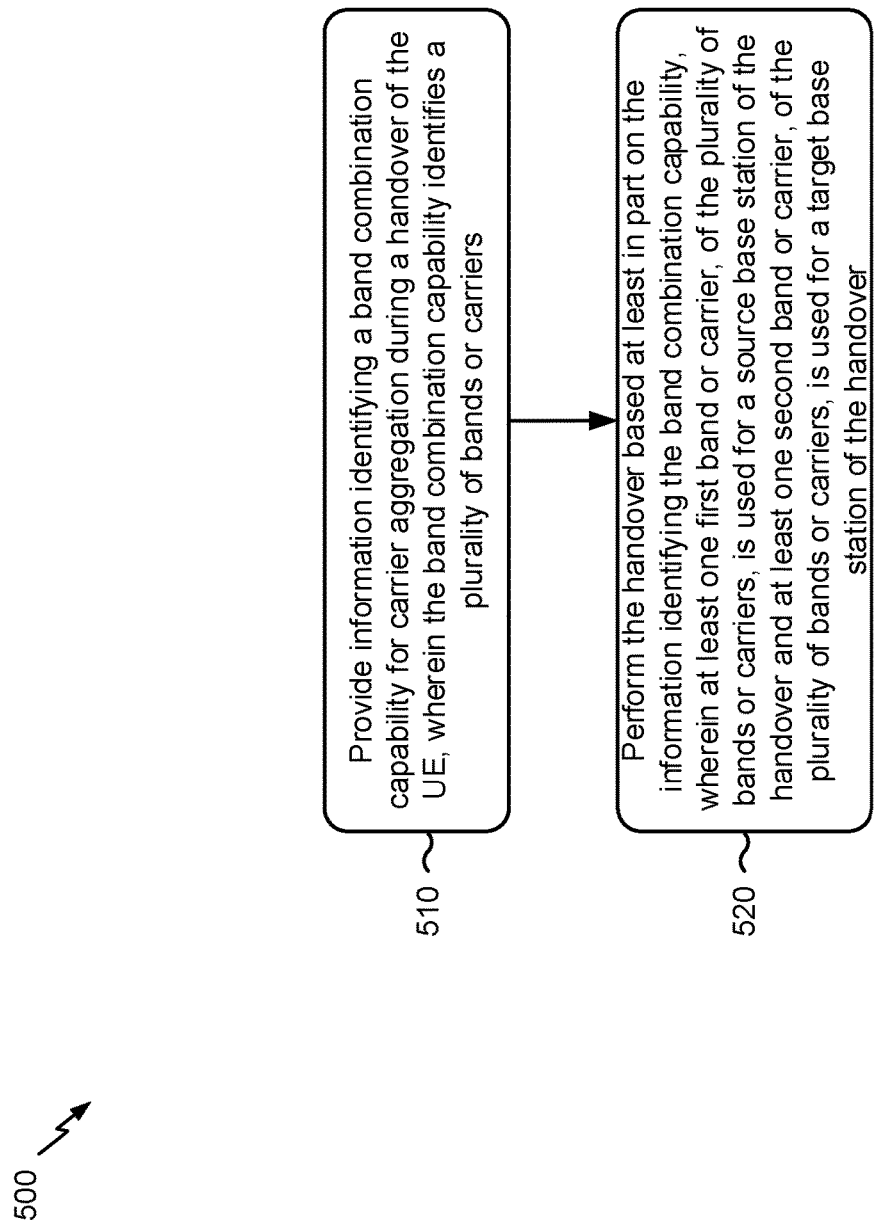
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120) performs low-latency handover using carrier aggregation.

As shown in FIG. 5, in some aspects, process 500 may include providing information identifying a band combination capability for carrier aggregation during a handover of the UE, wherein the band combination capability identifies a plurality of bands or carriers (block 510). For example, the UE (e.g., using controller/processor 280, transmit processor 264, TX MIMO processor 266, MOD 254, antenna 252, and/or the like) may provide information identifying a band combination capability for carrier aggregation. The band combination may be for carrier aggregation during a handover of the UE, and may identify a plurality of bands or carriers.

As shown in FIG. 5, in some aspects, process 500 may include performing the handover based at least in part on the information identifying the band combination capability, wherein at least one first band or carrier, of the plurality of bands or carriers, is used for a source base station of the handover and at least one second band or carrier, of the plurality of bands or carriers, is used for a target base station of the handover (block 520). For example, the UE (e.g., using antenna 252, DEMOD 254, MIMO detector 256, receive processor 258, controller/processor 280, and/or the like) may perform the handover based at least in part on the information identifying the band combination capability. In some aspects, at least one first band or carrier of the plurality of bands or carriers may be used for the source BS. In some aspects, at least one second band or carrier of the plurality of bands or carriers may be used for the target BS.

Process 500 may include additional aspects, such as any single aspect or any combination of aspects described below and/or in connection with one or more other processes described elsewhere herein.

In a first aspect, the plurality of bands or carriers are usable with regard to both the source base station and the target base station. In a second aspect, alone or in combination with the first aspect, the at least one first band or carrier is associated with a different band than the at least one second band or carrier, wherein the at least one first band or carrier is used for a primary cell of the source base station, and wherein the at least one second band or carrier is used for a primary cell of the target base station. In a third aspect, alone or in combination with any of the first and second aspects, the source base station is associated with a different set of bands or carriers, of the plurality of bands or carriers, than the target base station. In a fourth aspect, alone or in combination with any of the first through third aspects, the band combination capability indicates whether the UE supports uplink communication in one or more bands or carriers of the plurality of bands or carriers. In a fifth aspect, alone or in combination with any of the first through fourth aspects, the at least one first band or carrier is used for a primary cell of the source base station, and the at least one second band or carrier is used for a primary cell of the target base station, based at least in part on the UE supporting uplink communication in the at least one first band or carrier and the at least one second band or carrier.

In a sixth aspect, alone or in combination with any of the first through fifth aspects, when the UE does not support uplink carrier aggregation during the handover, the UE is configured to time-division multiplex uplink communications with regard to the source base station and the target base station. In a seventh aspect, alone or in combination with any of the first through sixth aspects, the UE may receive handover information indicating that the at least one first band or carrier is to be used for the source base station and the at least one second band or carrier is to be used for the target base station. In an eighth aspect, alone or in combination with any of the first through seventh aspects, the UE is configured to concurrently communicate with the source base station using the at least one first band or carrier and the target base station using the at least one second band or carrier after receiving the handover information and before the handover is complete.

In a ninth aspect, alone or in combination with any of the first through eighth aspects, the handover information is first handover information, and the UE is configured to communicate with the target base station, after the handover is complete, based at least in part on second handover information. In a tenth aspect, alone or in combination with any of the first through ninth aspects, the second handover information is received with the first handover information.

In an eleventh aspect, alone or in combination with any of the first through tenth aspects, the UE is configured to start monitoring the at least one second band or carrier after transmitting a reconfiguration complete message to the target base station. In a twelfth aspect, alone or in combination with any of the first through eleventh aspects, the information identifying the band combination capability explicitly indicates which bands or carriers, of the plurality of bands or carriers, are to be used for the source base station or the target base station.

In a thirteenth aspect, alone or in combination with any of the first through twelfth aspects, any combination of the plurality of bands or carriers is usable for the source base station and for the target base station. In a fourteenth aspect, alone or in combination with any of the first through thirteenth aspects, the information identifying the band combination capability identifies a maximum number of bands or carriers of the plurality of bands or carriers.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
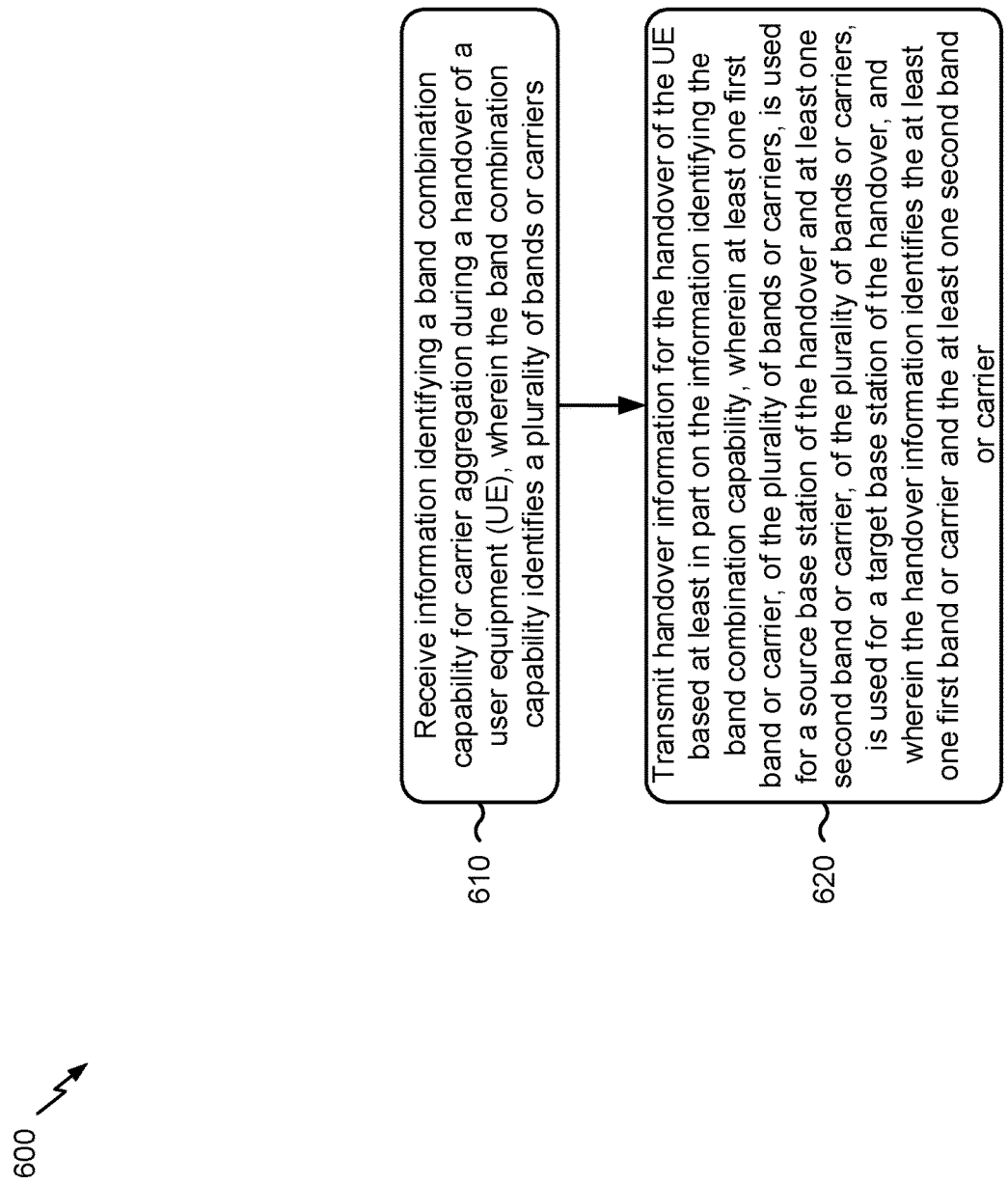
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. Example process 600 is an example where a base station (e.g., BS 110) performs low-latency handover using carrier aggregation.

As shown in FIG. 6, in some aspects, process 600 may include receiving information identifying a band combination capability for carrier aggregation during a handover of a UE, wherein the band combination capability identifies a plurality of bands or carriers (block 610). For example, the base station (e.g., using antenna 234, DEMOD 232, MIMO detector 236, receive processor 238, controller/processor 240, and/or the like) may receive information identifying a band combination capability of a UE. The band combination capability may be for carrier aggregation during a handover of the UE. The band combination capability may identify a plurality of bands or carriers.

As shown in FIG. 6, in some aspects, process 600 may include transmitting handover information for the handover of the UE based at least in part on the information identifying the band combination capability, wherein at least one first band or carrier, of the plurality of bands or carriers, is used for a source base station of the handover and at least one second band or carrier, of the plurality of bands or carriers, is used for a target base station of the handover, and wherein the handover information identifies the at least one first band or carrier and the at least one second band or carrier (block 620). For example, the base station (e.g., using controller/processor 240, transmit processor 220, TX MIMO processor 230, MOD 232, antenna 234, and/or the like) may transmit handover information. In some aspects, the handover information may include mobility control information. The handover information may be based at least in part on the information identifying the band combination capability. In some aspects, at least one first band or carrier of the plurality of bands or carriers may be used for the source BS. In some aspects, at least one second band or carrier of the plurality of bands or carriers may be used for the target BS. The handover information may identify the at least one first band or carrier and the at least one second band or carrier.

Process 600 may include additional aspects, such as any single aspect or any combination of aspects described below and/or in connection with one or more other processes described elsewhere herein.

In a first aspect, the plurality of bands or carriers is usable with regard to the source base station and the target base station. In a second aspect, alone or in combination with the first aspect, the at least one first band or carrier is associated with a different band than the at least one second band or carrier, wherein the at least one first band or carrier is used for a primary cell of the source base station, and wherein the at least one second band or carrier is used for a primary cell of the target base station.

In a third aspect, alone or in combination with any of the first and second aspects, the source base station is associated with a different set of bands or carriers, of the plurality of bands or carriers, than the target base station. In a fourth aspect, alone or in combination with any of the first through third aspects, the band combination capability indicates whether the UE supports uplink communication in one or more bands or carriers of the plurality of bands or carriers. In a fifth aspect, alone or in combination with any of the first through fourth aspects, the at least one first band or carrier is to be used for a primary cell of the source base station, and the at least one second band or carrier is to be used for a primary cell of the target base station, based at least in part on the UE supporting uplink communication in the at least one first band or carrier and the at least one second band or carrier.

In a sixth aspect, alone or in combination with any of the first through fifth aspects, when the UE does not support uplink carrier aggregation during the handover, the handover information indicates to time-division multiplex uplink communications with regard to the source base station and the target base station. In a seventh aspect, alone or in combination with any of the first through sixth aspects, the handover information is first handover information. The base station may provide second handover information based at least in part on which the UE is to communicate with the target base station after the handover is complete.

In an eighth aspect, alone or in combination with any of the first through seventh aspects, the second handover information is provided with the first handover information, and the second handover information indicates bands or carriers to be used for communication with only the target base station. In a ninth aspect, alone or in combination with any of the first through eighth aspects, the information identifying the band combination capability explicitly indicates which bands or carriers, of the plurality of bands or carriers, are to be used for the source base station or the target base station. In a tenth aspect, alone or in combination with any of the first through ninth aspects, any combination of the plurality of bands or carriers is usable for the source base station and for the target base station. In an eleventh aspect, alone or in combination with any of the first through tenth aspects, the information identifying the band combination capability identifies a maximum number of bands or carriers of the plurality of bands or carriers. In a twelfth aspect, alone or in combination with any of the first through eleventh aspects, the base station is at least one of the source base station or the target base station.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
providing information identifying a band combination capability for performing a handover of the UE using carrier aggregation,
wherein the band combination capability identifies a plurality of bands or carriers; and
performing the handover based at least in part on the information identifying the band combination capability,
wherein at least one first band or carrier, of the plurality of bands or carriers, is used for a source base station of the handover and at least one second band or carrier, of the plurality of bands or carriers, is used for a target base station of the handover.

2. The method of claim 1, further comprising:
receiving handover information indicating that the at least one first band or carrier is to be used for the source base station and the at least one second band or carrier is to be used for the target base station.

3. The method of claim 2, wherein the UE is configured to concurrently communicate with the source base station using the at least one first band or carrier and the target base station using the at least one second band or carrier after receiving the handover information and before the handover is complete.

4. The method of claim 2, wherein the handover information is first handover information, and wherein the UE is configured to communicate with the target base station, after the handover is complete, based at least in part on second handover information.

5. The method of claim 4, wherein the second handover information is received with the first handover information.

6. The method of claim 1, wherein, when the UE does not support uplink carrier aggregation during the handover, the UE is configured to time-division multiplex uplink communications with regard to the source base station and the target base station.

7. The method of claim 1, wherein the UE is configured to start monitoring the at least one second band or carrier after transmitting a reconfiguration complete message to the target base station.

8. The method of claim 1, wherein the information identifying the band combination capability explicitly indicates which bands or carriers, of the plurality of bands or carriers, are to be used for the source base station or the target base station.

9. The method of claim 1, wherein any combination of the plurality of bands or carriers is usable for the source base station and for the target base station.

10. The method of claim 1, wherein the information identifying the band combination capability identifies a maximum number of bands or carriers of the plurality of bands or carriers.

11. A method of wireless communication performed by a base station, comprising:
receiving information identifying a band combination capability for performing a handover of a user equipment (UE) using carrier aggregation,
wherein the band combination capability identifies a plurality of bands or carriers; and
transmitting handover information for the handover of the UE based at least in part on the information identifying the band combination capability,
wherein at least one first band or carrier, of the plurality of bands or carriers, is used for a source base station of the handover and at least one second band or carrier, of the plurality of bands or carriers, is used for a target base station of the handover, and wherein the handover information identifies the at least one first band or carrier and the at least one second band or carrier.

12. The method of claim 11, wherein, when the UE does not support uplink carrier aggregation during the handover, the handover information indicates to time-division multiplex uplink communications with regard to the source base station and the target base station.

13. The method of claim 11, wherein the handover information is first handover information, and wherein the method further comprises:
providing second handover information based at least in part on which the UE is to communicate with the target base station after the handover is complete.

14. The method of claim 13, wherein the second handover information is provided with the first handover information, and wherein the second handover information indicates bands or carriers to be used for communication with only the target base station.

15. The method of claim 11, wherein the information identifying the band combination capability explicitly indicates which bands or carriers, of the plurality of bands or carriers, are to be used for the source base station or the target base station.

16. The method of claim 11, wherein any combination of the plurality of bands or carriers is usable for the source base station and for the target base station.

17. The method of claim 11, wherein the information identifying the band combination capability identifies a maximum number of bands or carriers of the plurality of bands or carriers.

18. The method of claim 11, wherein the base station is at least one of the source base station or the target base station.

19. A user equipment (UE) for wireless communication, comprising:
a memory; and
one or more processors operatively coupled to the memory, the memory and the one or more processors configured to:
provide information identifying a band combination capability for performing a handover of the UE using carrier aggregation,
wherein the band combination capability identifies a plurality of bands or carriers; and
perform the handover based at least in part on the information identifying the band combination capability,
wherein at least one first band or carrier, of the plurality of bands or carriers, is used for a source base station of the handover and at least one second band or carrier, of the plurality of bands or carriers, is used for a target base station of the handover.

20. The UE of claim 19, wherein the one or more processors are further to:
receive handover information indicating that the at least one first band or carrier is to be used for the source base station and the at least one second band or carrier is to be used for the target base station.

21. The UE of claim 20, wherein the UE is configured to concurrently communicate with the source base station using the at least one first band or carrier and the target base station using the at least one second band or carrier after receiving the handover information and before the handover is complete.

22. The UE of claim 20, wherein the handover information is first handover information, and wherein the UE is configured to communicate with the target base station, after the handover is complete, based at least in part on second handover information.

23. The UE of claim 22, wherein the second handover information is received with the first handover information.

24. The UE of claim 19, wherein the information identifying the band combination capability explicitly indicates which bands or carriers, of the plurality of bands or carriers, are to be used for the source base station or the target base station.

25. The UE of claim 19, wherein any combination of the plurality of bands or carriers is usable for the source base station and for the target base station.

26. The UE of claim 19, wherein the information identifying the band combination capability identifies a maximum number of bands or carriers of the plurality of bands or carriers.

27. A base station for wireless communication, comprising:
a memory; and
one or more processors operatively coupled to the memory, the memory and the one or more processors configured to:
receive information identifying a band combination capability for performing a handover of a user equipment (UE) using carrier aggregation,
wherein the band combination capability identifies a plurality of bands or carriers; and
transmit handover information for the handover of the UE based at least in part on the information identifying the band combination capability,
wherein at least one first band or carrier, of the plurality of bands or carriers, is used for a source base station of the handover and at least one second band or carrier, of the plurality of bands or carriers, is used for a target base station of the handover, and wherein the handover information identifies the at least one first band or carrier and the at least one second band or carrier.

28. The base station of claim 27, wherein, when the UE does not support uplink carrier aggregation during the handover, the handover information indicates to time-division multiplex uplink communications with regard to the source base station and the target base station.

29. The base station of claim 27, wherein the handover information is first handover information, and wherein the one or more processors are further to:
provide second handover information based at least in part on which the UE is to communicate with the target base station after the handover is complete.

30. The base station of claim 29, wherein the second handover information is provided with the first handover information.

* * * * *